United States Patent
Quigley et al.

(10) Patent No.: US 10,082,061 B1
(45) Date of Patent: Sep. 25, 2018

(54) PREDICTIVE CONTROL FOR SLIP AND BREAKTHROUGH DETERMINATION OF SELECTIVE CATALYTIC REDUCTION SYSTEMS

(71) Applicant: GM GLOBAL TECHNOLOGY OPERATIONS LLC, Detroit, MI (US)

(72) Inventors: David P. Quigley, Brighton, MI (US); David Edwards, Rochester Hills, MI (US); Sarah Funk, Canton, MI (US); Anirban Sett, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 15/451,447

(22) Filed: Mar. 7, 2017

(51) Int. Cl.
*F01N 3/20* (2006.01)
*F01N 11/00* (2006.01)
*F02D 41/02* (2006.01)
*B01D 53/94* (2006.01)

(52) U.S. Cl.
CPC ......... *F01N 3/208* (2013.01); *B01D 53/9418* (2013.01); *B01D 53/9495* (2013.01); *F01N 11/002* (2013.01); *F02D 41/0235* (2013.01); *F01N 2550/02* (2013.01); *F01N 2560/026* (2013.01); *F01N 2560/06* (2013.01); *F01N 2610/1406* (2013.01); *F01N 2610/146* (2013.01)

(58) Field of Classification Search
CPC ...... F01N 3/2066; F01N 3/208; F01N 11/002; F01N 2560/026; F01N 2560/06; F01N 2610/146
See application file for complete search history.

(56) References Cited

U.S. PATENT DOCUMENTS

| | | |
|---|---|---|
| 7,810,476 B2 | 10/2010 | Wang et al. |
| 8,091,416 B2 | 1/2012 | Wang et al. |
| 8,201,444 B2 | 6/2012 | Wang et al. |
| 8,276,373 B2 | 10/2012 | Wang et al. |
| 8,327,621 B2 | 12/2012 | Larose, Jr. et al. |
| 8,387,384 B2 | 3/2013 | Quigley et al. |
| 8,392,091 B2 | 3/2013 | Hebbale et al. |
| 8,402,748 B2 | 3/2013 | Funk |
| 8,612,119 B2 | 12/2013 | Wang et al. |
| 8,617,495 B1 | 12/2013 | Funk et al. |

(Continued)

*Primary Examiner* — Audrey K Bradley
(74) *Attorney, Agent, or Firm* — Quinn IP Law

(57) ABSTRACT

Disclosed are SCR predictive control systems, methods for using such control systems, and motor vehicles with SCR employing predictive control. A method for regulating operation of an SCR system includes receiving sensor signals indicative of NOx output downstream from an SCR catalyst, and sensor signals indicative of exhaust gas temperature upstream from the SCR catalyst. The method determines if a model error condition has occurred for the NOx output signal and, responsive to such an occurrence, modulating dosing injector output for at least a calibrated designated time period. Upon expiration of the designated time period, the dosing injector is activated and commanded to inject reductant in accordance with a modulated dosing value. After the dosing injector injects the modulated dosing value of reductant, the method determines if the SCR system is underdosing or overdosing based on a response shape of signals received from the outlet NOx content sensor.

20 Claims, 3 Drawing Sheets

(56) References Cited

U.S. PATENT DOCUMENTS

| | | |
|---|---|---|
| 8,694,197 B2 | 4/2014 | Rajagopalan et al. |
| 8,857,152 B2 | 10/2014 | Whitt et al. |
| 8,893,482 B2 | 11/2014 | Funk et al. |
| 9,133,750 B2 | 9/2015 | Levijoki et al. |
| 9,194,268 B2 | 11/2015 | Kowalkowski et al. |
| 2008/0051973 A1 | 2/2008 | Gangopadhyay et al. |
| 2012/0085082 A1 | 4/2012 | Levijoki et al. |
| 2012/0286063 A1 | 11/2012 | Wang et al. |
| 2014/0301925 A1* | 10/2014 | Korpics ............. B01D 53/9495 423/212 |

* cited by examiner

PREDICTIVE CONTROL FOR SLIP AND BREAKTHROUGH DETERMINATION OF SELECTIVE CATALYTIC REDUCTION SYSTEMS

INTRODUCTION

The present disclosure relates generally to emission control and exhaust aftertreatment systems. More specifically, aspects of this disclosure relate to control strategies of aftertreatment nitrogen oxide (NOx) reduction for post-combustion emissions of internal combustion engine (ICE) assemblies.

Current production motor vehicles, such as the modern-day automobile, are originally equipped with a powertrain that operates to propel the vehicle and power the onboard vehicle electronics. The powertrain, which is inclusive of, and oftentimes misclassified as, a vehicle drivetrain, is generally comprised of a prime mover that delivers driving power to the vehicle's final drive system (e.g., rear differential, axle, and wheels) through a multi-speed power transmission. Automobiles have generally been powered by a reciprocating-piston type internal combustion engine because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid vehicles, on the other hand, utilize alternative power sources, such as battery and fuel-cell powered electric motors, to propel the vehicle, minimizing reliance on the engine for power and, thus, increasing overall fuel economy.

A typical overhead valve internal combustion engine includes an engine block with a series of cylinder bores, each of which has a piston reciprocally movable therein. Coupled to a top surface of the engine block is a cylinder head that cooperates with the piston and cylinder bore to form a variable-volume combustion chamber. These reciprocating pistons are used to convert pressure—generated by igniting a fuel-and-air mixture compressed inside the combustion chamber—into rotational forces to drive a crankshaft. The cylinder head is fabricated with intake ports through which air, provided by an intake manifold, is selectively introduced to each combustion chamber. Also defined in the cylinder head are exhaust ports through which exhaust gases and byproducts of combustion are selectively evacuated from the combustion chambers to an exhaust manifold. The exhaust manifold, in turn, collects and combines the exhaust gases for recirculation into the intake manifold, delivery to a turbine-driven turbocharger, and/or evacuation from the ICE via an exhaust system.

Exhaust gases produced during each combustion work cycle of an ICE assembly may include particulate matter and other known by-products of combustion, such as carbon monoxide (CO), hydrocarbons (HC), volatile organic compounds (VOCs), and nitrogen oxides (NOx). Exhaust aftertreatment systems operate to oxidize unburned hydrocarbons and carbon monoxide to carbon dioxide and water, and to reduce mixtures of nitrogen oxides to nitrogen and water before the gas is released into the atmosphere. Exhaust treatment may incorporate, singly and in any combination, an oxidation catalyst (OC), NOx absorbers/adsorbers, exhaust gas recirculation (EGR), a selective catalytic reduction (SCR) system, a particulate matter (PM) filter, catalytic converters, and other means of emissions control. Selective catalytic reduction is an advanced active emissions control technology that injects a dosing agent, such as anhydrous or aqueous ammonia (NH3) or automotive-grade urea (otherwise known as Diesel Exhaust Fluid (DEF)), into the exhaust gas stream. This dosing agent includes a reductant that is absorbed onto an SCR catalyst surface and reacts with the NOx in the exhaust gas. The SCR catalyst may then break down or reduce the NOx into water vapor (H2O) and nitrogen gas (N2).

Dosing agent is normally injected into the gas flow upstream from the SCR catalyst(s) such that the liquid reductant is absorbed onto the catalyst before it reacts with NOx-entrained gasses passing through the SCR system. Where the reductant used is ammonia, the dosing agent thermally decomposes into ammonia within the SCR system before being absorbed onto the catalyst. When the SCR system is properly dosed with reductant, the reduction reaction should eliminate most if not all of the NOx and ammonia before the gas is released to the surrounding atmosphere. If more ammonia is injected into the system than can be absorbed by the catalyst(s), the SCR system is said to be "overdosed" and ammonia may be inadvertently emitted from the exhaust system (commonly known as "ammonia slip"). Conversely, if an insufficient amount of ammonia is injected and absorbed onto the catalyst(s) to react with all of the passing NOx, the SCR system is said to be "underdosed" and may allow unprocessed NOx to be emitted from the exhaust system (commonly known as "NOx breakthrough").

SUMMARY

Disclosed herein are multivariable predictive control algorithms and control systems for regulating selective catalytic reduction (SCR) of emission control systems, methods for making and methods for using such control systems, internal combustion engine (ICE) assemblies having SCR capabilities with predictive control, and motor vehicles equipped with such engines. By way of example, and not limitation, there is presented a unique method for determining if an SCR system is in a state of reductant overdose (also referred to herein as "slip") or a state of reductant underdose (also referred to herein as "breakthrough"). For instance, during steady state SCR system operating conditions, upstream and downstream NOx content is monitored to determine if/when a downstream NOx sensor reading is higher or lower than a predetermined downstream NOx model value by a system calibrated value, otherwise known as a model error condition. Responsive to occurrence of a model error condition, the SCR system's dosing agent injection device (also known as a "DEF doser") is modulated, reduced or otherwise temporarily suspended for a designated period of time. This designated time period may be calculated in real-time based on NH3 consumed, can temperature, current engine exhaust conditions, ambient conditions, etc.

After expiration of the designated period of time, during which a predetermined mass of NH3 may be consumed, DEF doser output is returned to normal or otherwise activated. The DEF doser will be modulated to dose for a programmed period of time at an increased or decreased percentage of the commanded injection value (e.g., greater or less than 100% of normal injection volume) for those operating conditions. This percentage may be calculated in real-time from current system operating conditions. While the DEF doser is operating at this modified value, downstream NOx sensor signals are evaluated to determine whether the system is in slip or breakthrough. In a slip condition (overdose state), the downstream NOx signal will not vary significantly when DEF doser output is returned to normal. In a breakthrough condition (underdose state), the downstream NOx signal will drop quickly when DEF doser output is returned to normal. This difference in behavior allows the system to readily determine the state of the SCR system and, if so desired, adjust one or more DEF doser commanded injection values to reduce the likelihood of future slip and breakthrough conditions.

Attendant benefits for at least some of the disclosed concepts include reduced SCR system designated time period which, in turn, leads to reduced exhaust system NOx tailpipe emissions. Disclosed SCR control logic and system architectures help to improve the accuracy of slip/breakthrough determination when under steady state conditions. More robust slip/breakthrough determination is provided for both high and low NOx inlet conditions, e.g., caused by changing road conditions, operator inputs, system demands, etc. Disclosed systems and methods also help to minimize the reoccurrence of undesirable overdosing and underdosing states by employing closed-loop feedback to systematically update SCR operating parameters.

Aspects of the present disclosure are directed to SCR monitoring and control system architectures for commercial and industrial boilers, gas turbines, and reciprocating-piston type internal combustion engine assemblies with SCR functionality. Disclosed, for example, is a multivariable predictive control system for regulating operation of an SCR exhaust aftertreatment system. The SCR system is generally composed of one or more SCR catalysts, a reductant storage tank that is fluidly connected to the SCR catalyst(s), and a dosing injector operable for selectively injecting reductant onto the SCR catalyst(s) to chemically reduce exhaust-gas-entrained nitrogen oxide emissions. The predictive control system includes various sensing devices, such as an NOx content sensor that detects NOx output (e.g., NOx concentration) downstream from the SCR catalyst, and an SCR temperature sensor that detects exhaust gas inlet temperature upstream from the SCR catalyst. Other system sensing devices may include, but are not limited to: an NOx content sensor for detecting NOx input upstream from the SCR catalyst; an SCR temperature sensor for detecting exhaust gas outlet temperature downstream from the SCR catalyst; and/or an SCR catalyst temperature sensor for detecting current temperature of the SCR catalyst.

An electronic control unit (ECU) is communicatively connected to the outlet NOx content sensor and the inlet SCR temperature sensor. This ECU is configured to: receive, from the NOx content sensor, one or more signals indicative of NOx output downstream from the SCR catalyst; receive, from the SCR temperature sensor, one or more signals indicative of exhaust gas inlet temperature upstream from the SCR catalyst; determine if a model error condition has occurred; responsive to a determination that the model error condition has occurred, determine a designated reduction time based on the exhaust gas inlet temperature signal; command the dosing injector to modulate output for at least the designated reduction time; determine a modulated dosing value for the dosing injector; upon expiration of the designated time period, command the dosing injector to activate and inject reductant in accordance with the modulated dosing value for a designated period of time; and, as the dosing injector injects the modulated dosing value of reductant, determine if the SCR system is in an underdose or overdose state based on a response shape of signals received from the outlet NOx content sensor.

Other aspects of the present disclosure are directed to motor vehicles with reciprocating-piston-type engines and SCR exhaust aftertreatment systems with predictive control capabilities. A "motor vehicle," as used herein, may include any relevant vehicle platform, such as passenger vehicles (internal combustion engine, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, boats, airplanes, trains, etc. In an example, a motor vehicle is presented that includes a vehicle body with an engine compartment, and an internal combustion engine (ICE) assembly stowed in the engine compartment. The ICE assembly includes an engine block with multiple cylinder bores, and a piston reciprocally movable within each one of the cylinder bores. An SCR exhaust aftertreatment system is fluidly coupled to the ICE assembly. The SCR system includes one or more SCR catalysts fluidly coupled, e.g., via a fluid conduit and spray nozzle, to a storage tank storing a fluid reductant. An electronic dosing injector is selectively operable to inject reductant into NOx-entrained exhaust streams passing through the SCR system.

An outlet NOx content sensor detects NOx output downstream from the SCR catalyst(s), whereas an inlet SCR temperature sensor detects exhaust gas inlet temperature upstream from the SCR catalyst(s). An onboard or remote ECU, which is communicatively connected to the various system sensors, is programmed to receive signals indicative of NOx output downstream from the SCR catalyst(s), and signals indicative of the exhaust gas inlet temperature upstream from the SCR catalyst(s). The ECU then determines if a model error condition has occurred for a received NOx output signal and, responsive to such an occurrence, determines a designated time period based on, for example, an exhaust gas inlet temperature signal. The ECU modulates the dosing injector output for at least the designated time period and determines a modulated dosing value for the dosing injector, e.g., at current SCR system operating conditions. Upon expiration of the designated time period, the ECU returns dosing injector output to normal and commands the injector to inject reductant in accordance with the modulated dosing value. As the dosing injector finishes injecting the modulated dosing value of reductant, the ECU determines if the SCR system is in an underdose state or an overdose state based on the response shape of signals received from the outlet NOx content sensor.

Additional aspects of this disclosure are directed to control logic and algorithms for multivariable predictive control with closed-loop functionality for regulating operation of SCR exhaust aftertreatment systems. For instance, a method is disclosed for operating a predictive control system for regulating an SCR system. The method includes, in any order and in any combination with any of the disclosed features: receiving, via a controller from an outlet NOx content sensor, a signal indicative of an NOx output downstream from the SCR catalyst; receiving, via the controller from an inlet SCR temperature sensor, a signal indicative of an exhaust gas inlet temperature upstream from the SCR catalyst; determining if a model error condition has occurred for the NOx output signal; responsive to a determination that the model error condition has occurred, determining a designated time period based on the exhaust gas inlet temperature signal; modulating the dosing injector output for at least the designated time period; determining a modulated dosing value for the dosing injector; upon expiration of the designated time period, activating and commanding the dosing injector to inject reductant in accordance with the modulated dosing value; and determining if the SCR system is in an underdose state or an overdose state based on a response shape of signals received from the outlet NOx content sensor as the dosing injector injects the modulated dosing value of reductant.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
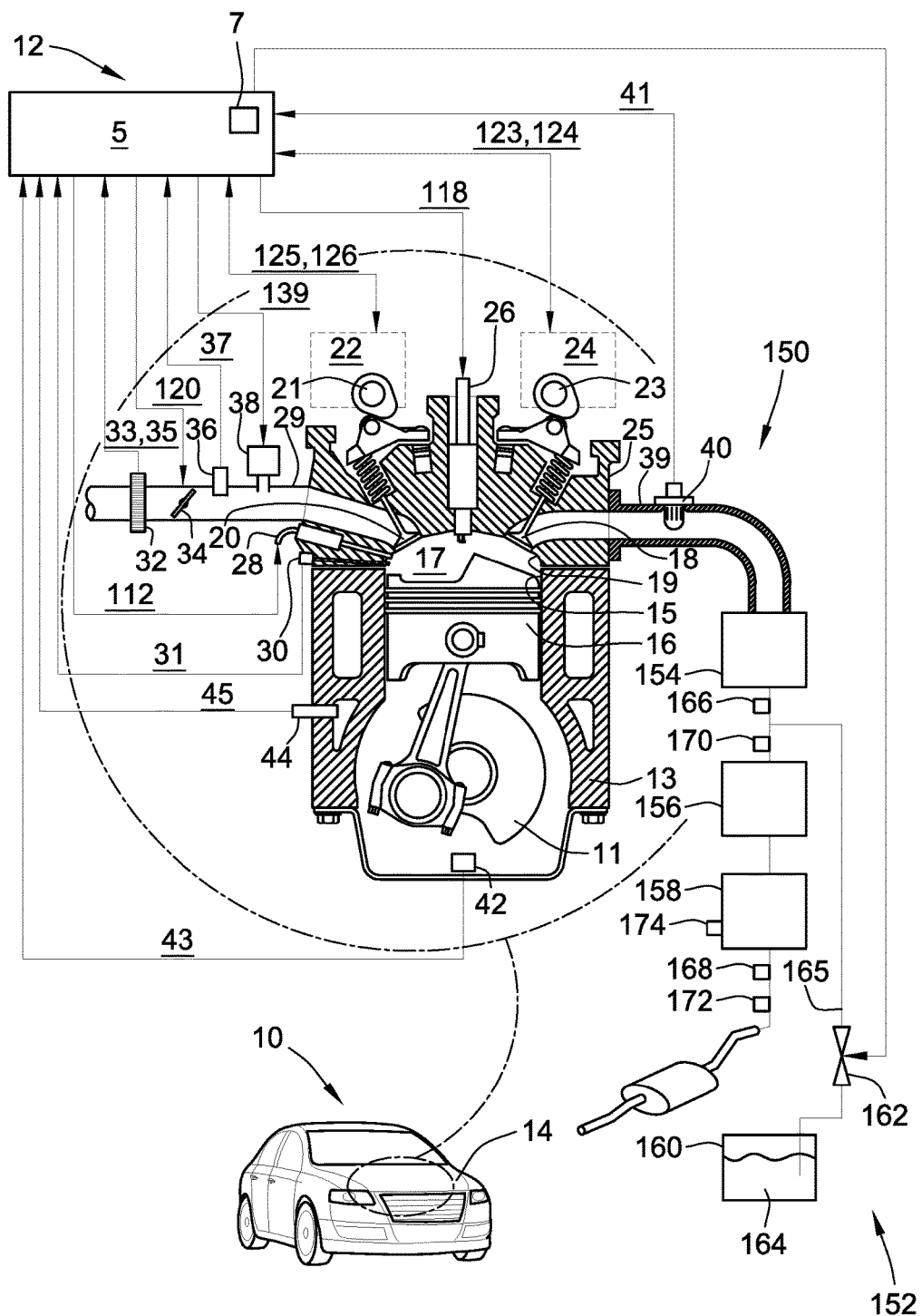
FIG. 1 is a front perspective-view illustration of a representative motor vehicle with an inset schematic illustration of a representative reciprocating-piston type internal combustion engine (ICE) assembly with selective catalytic reduction (SCR) capabilities in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a perspective-view illustration of a representative automobile, which is designated generally at 10 and portrayed herein for purposes of discussion as a four-door sedan-style passenger vehicle. Mounted at a forward portion of the automobile 10, e.g., aft of a front bumper fascia and grille and forward of a passenger compartment, is an internal combustion engine (ICE) assembly 12 housed within an engine compartment covered by an engine hood 14. The illustrated automobile 10—also referred to herein as "motor vehicle" or "vehicle" for short—is merely an exemplary application with which the novel aspects and features of this disclosure may be practiced. In the same vein, the implementation of the present concepts into a spark-ignited direct-injection (SIDI) engine configuration should also be appreciated as an exemplary application of the novel concepts disclosed herein. As such, it will be understood that the aspects and features of the present disclosure may be applied to other engine architectures, implemented for other exhaust aftertreatment systems, and utilized for any logically relevant type of motor vehicle. In the same vein, aspects of this disclosure can be utilized for non-vehicle based applications, such as large electric utility boilers, industrial-grade boilers, process heaters, gas turbines, etc. Lastly, the drawings presented herein are not necessarily to scale and are provided purely for instructional purposes. Thus, the specific and relative dimensions shown in the drawings are not to be construed as limiting.

There is shown in FIG. 1 an example of a multi-cylinder, dual overhead cam (DOHC), inline-type ICE assembly 12. The illustrated ICE assembly 12 is a four-stroke reciprocating-piston engine configuration that operates to propel the vehicle 10, for example, as a direct injection gasoline engine, including flexible-fuel vehicle (FFV) and hybrid vehicle variations thereof. The ICE assembly 12 may optionally operate in any of an assortment of selectable combustion modes, including a homogeneous-charge compression-ignition (HCCI) combustion mode and other compression-ignition (CI) combustion modes. Additionally, the ICE assembly 12 may operate at a stoichiometric air/fuel ratio and/or at an air/fuel ratio that is primarily lean of stoichiometry. This engine 12 includes a series of reciprocating pistons 16 slidably movable in cylinder bores 15 of an engine block 13. The top surface of each piston 16 cooperates with the inner periphery of its corresponding cylinder 15 and a recessed chamber surface 19 of a cylinder head 25 to define a variable volume combustion chambers 17. Each piston 16 is connected to a rotating crankshaft 11 by which linear reciprocating motion of the pistons 16 is output, for example, to a power transmission (not shown) as rotational motion via the crankshaft 11.

An air intake system transmits intake air to the cylinders 15 through an intake manifold 29, which directs and distributes air into the combustion chambers 17, e.g., via intake runners of the cylinder head 25. The engine's air intake system has airflow ductwork and various electronic devices for monitoring and controlling the flow of intake air. The air intake devices may include, as non-limiting examples, a mass airflow sensor 32 for monitoring mass airflow (MAF) 33 and intake air temperature (IAT) 35. A throttle valve 34 controls airflow to the ICE assembly 12 in response to a control signal (ETC) 120 from a programmable electronic control unit (ECU) 5. A pressure sensor 36 operatively coupled to the intake manifold 29 monitors, for instance, manifold absolute pressure (MAP) 37 and barometric pressure. An optional external flow passage recirculates exhaust gases from engine exhaust to the intake manifold 29, e.g., via a control valve in the nature of an exhaust gas recirculation (EGR) valve 38. The programmable ECU 5 controls mass flow of exhaust gas to the intake manifold 29 by regulating the opening and closing of EGR valve 38 via EGR command 139. In FIG. 1, the arrows connecting ECU 5 with the various components of the ICE assembly 12 are emblematic of electronic signals or other communication exchanges by which data and/or control commands are transmitted from one component to the other.

Airflow from the intake manifold 29 into each combustion chamber 17 is controlled by one or more dedicated intake engine valves 20. Evacuation of exhaust gases out of the combustion chamber 17 to an exhaust aftertreatment system, designated generally at 150, via an exhaust manifold 39 is controlled by one or more dedicated exhaust engine valves 18. In accord with at least some of the disclosed embodiments, exhaust aftertreatment system 150 includes a selective catalytic reduction (SCR) exhaust aftertreatment system 152 downstream from the exhaust manifold 39. The engine valves 18, 20 are illustrated herein as spring-biased poppet valves; however, other known types of engine valves may be employed. The ICE assembly 12 valve train system is equipped to control and adjust the opening and closing of the intake and exhaust valves 20, 18. According to one example, the activation of the intake and exhaust valves 20, 18 may be respectively modulated by controlling intake and exhaust variable cam phasing/variable lift control (VCP/VLC) devices 22 and 24. These two VCP/VLC devices 22, 24 are configured to control and operate an intake camshaft 21 and an exhaust camshaft 23, respectively. Rotation of these intake and exhaust camshafts 21 and 23 are linked and/or indexed to rotation of the crankshaft 11, thus linking openings and closings of the intake and exhaust valves 20, 18 to positions of the crankshaft 11 and the pistons 16.

Each intake VCP/VLC device 22 may be fabricated with a mechanism operative to switch and control valve lift of the intake valve(s) 20 in response to a control signal (iVLC) 125, and variably adjust and control phasing of the intake camshaft 21 for each cylinder 15 in response to a control signal (iVCP) 126. In the same vein, the exhaust VCP/VLC device 24 may include a mechanism operative to variably switch and control valve lift of the exhaust valve(s) 18 in response to a control signal (eVLC) 123, and variably adjust and control phasing of the exhaust camshaft 23 for each cylinder 15 in response to a control signal (eVCP) 124. The VCP/VLC devices 22, 24 may be actuated using any one of electro-hydraulic, hydraulic, electro-mechanic, and electric control force, in response to respective control signals eVLC 123, eVCP 124, iVLC 125, and iVCP 126, for example.

With continuing reference to the representative configuration of FIG. 1, ICE assembly 12 employs a gasoline direct injection (GDI) fuel injection subsystem with multiple high-pressure fuel injectors 28 that directly inject pulses of fuel into the combustion chambers 17. Each cylinder 15 is provided with one or more fuel injectors 28, which activate in response to an injector pulse width command (INJ_PW) 112 from the ECU 5. These fuel injectors 28 are supplied with pressurized fuel by a fuel distribution system (not shown). One or more or all of the fuel injectors 28 may be operable, when activated, to inject multiple fuel pulses (e.g., a succession of first, second, third, etc., injections of fuel mass) per working cycle into a corresponding one of the ICE assembly cylinders 15. The ICE assembly 12 employs a spark-ignition subsystem by which fuel-combustion-initiating energy—typically in the nature of an abrupt electrical discharge—is provided via a spark plug 26 for igniting, or assisting in igniting, cylinder charges in each of the combustion chambers 17 in response to a spark command (IGN) 118 from the ECU 5. Aspects and features of the present disclosure may be similarly applied to compression-ignited (CI) diesel engines.

The ICE assembly 12 is equipped with various sensing devices for monitoring engine operation, including a crank sensor 42 having an output indicative of crankshaft rotational position, e.g., crank angle and/or speed (RPM) signal 43. A temperature sensor 44 is operable to monitor, for example, one or more engine-related temperatures (e.g., coolant temperature, fuel temperature, exhaust temperature, etc.), and output a signal 45 indicative thereof. An in-cylinder combustion sensor 30 is operable to monitor combustion-related variables, such as in-cylinder combustion pressure, charge temperature, fuel mass, air-to-fuel ratio, etc., and output a signal 31 indicative thereof. An exhaust gas sensor 40 is operable to monitor exhaust-gas related variables, e.g., actual air/fuel ratio (AFR), burned gas fraction, etc., and output a signal 41 indicative thereof.

The combustion pressure and the crankshaft speed may be monitored by the ECU 5, for example, to determine combustion timing, i.e., timing of combustion pressure relative to the crank angle of the crankshaft 11 for each cylinder 15 for each working combustion cycle. It should be appreciated that combustion timing may be determined by other methods. Combustion pressure may be monitored by the ECU 5 to determine an indicated mean effective pressure (IMEP) for each cylinder 15 for each working combustion cycle. The ICE assembly 12 and ECU 5 cooperatively monitor and determine states of IMEP for each of the engine cylinders 15 during each cylinder firing event. Other sensing, monitoring and detection devices may be used to monitor states of other combustion parameters within the scope of the disclosure, e.g., ion-sense ignition systems, EGR fractions, and non-intrusive cylinder pressure sensors.

Control module, module, control, controller, electronic control unit, processor and similar terms mean any one or various combinations of one or more of Application Specific Integrated Circuit(s) (ASIC), electronic circuit(s), central processing unit(s) (e.g., microprocessor(s)), and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller-executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Also presented in FIG. 1 is a representative multivariable predictive control system architecture that helps to regulate operation of the SCR system 152 to more readily, efficiently, and robustly determine system slip and breakthrough to thereby help maximize NOx conversion efficiency and minimize ammonia slip while abating tailpipe NOx emissions. As shown, the representative SCR exhaust treatment system 152 is composed of an oxidation catalyst (OC) 154, an SCR catalyst 158 downstream from the OC 154, and a particulate filter (PF) 156 interposed between the OC 154 and SCR catalyst 158. Only select components of the SCR system 152 have been shown and will be described in further detail below. Nevertheless, the disclosed SCR system architectures can include numerous additional and alternative features, and other well-known peripheral components, for example, for carrying out the various functions and methodologies disclosed herein without departing from the intended scope of this disclosure. Furthermore, while not per se limited, the SCR system 152 is portrayed as a urea-based system that implements piecewise-homogenous distribution of urea for a single SCR catalyst. It is certainly within the scope of this disclosure, however, to implement additional SCR catalysts and employ other known or hereinafter developed dosing agents implemented through any relevant method of distribution.

According to the illustrated example, the OC 154, which may be in the nature of a diesel oxidation catalyst (DOC), helps to chemically oxidize carbon monoxide (CO), gas phased hydrocarbons (HC) and/or other organic compounds (e.g., organic fraction of diesel particulates (SOF)) in exhaust gases passing through the SCR system 152. One of the functions of a DOC is to convert NO into NO2, an NOx form that is more readily treated by an SCR catalyst. By comparison, the PF 156, which may be in the nature of a single-use, active or passive diesel particulate filter (DPF), helps to remove entrained particulate matter from the exhaust gas stream prior to being evacuated or recirculated. The SCR system 152 employs a reducing agent injected via a dosing injector 162 (also known as a "DEF doser") to reduce or otherwise eliminate NOx from exhaust gas. For instance, DOC-treated exhaust gases are directed to the SCR catalyst 158, which utilizes aqueous urea 164 (a mixture of approximately 32% urea and approximately 67% deionized water) or other functional dosing agent stored in a reductant storage tank 160 as a reactant to reduce NOx into other constituents. The dosing injector 162 may be in the nature of a solenoid-driven H-type or D-type spray valve that is actuable to inject urea 164 into an SCR fluid line 165.

Aqueous urea solution 164 (e.g., Diesel Exhaust Fluid (DEF)) injected into the exhaust gas stream breaks down into ammonia for absorption onto the SCR catalyst brick, if not immediately consumed by SCR chemical reactions. ECU 5 modulates the amount of urea (e.g., pulse-width and/or pulse volume) injected into SCR fluid line 165 upstream of the SCR catalyst 158 and, thus, the amount of NH3 supplied to the SCR catalyst 158. As previously indicated, the SCR catalyst 158 adsorbs or otherwise stores NH3 on the catalyst's honeycomb-like brick structure. The amount of NH3 stored by the SCR catalyst 158 may be referred to herein as a "catalyst NH3 storage level." NH3 stored in the SCR catalyst 158 reacts with NOx in the exhaust gas passing through the SCR system 152 such that water vapor ($H_2O$) and nitrogen gas ($N_2$) are emitted instead of NOX.

To provide SCR slip and breakthrough determination, ECU 5 communicates with an assortment of onboard and/or off-board sensing devices, including those shown in FIG. 1 and those described hereinabove and below, to aggregate relevant information for operation and optimization of the exhaust aftertreatment system 150. As shown in FIG. 1, the SCR system 152 employs a first (inlet) NOx content sensor 166, a second (outlet) NOx content sensor 168, a first (inlet) SCR temperature sensor 170, a second (outlet) SCR temperature sensor 172, and an SCR catalyst temperature sensor 174. Each NOx content sensor 166, 168, which may be in the nature of a solid-state electrochemical or amperometric NOx sensor, such as a high-temperature ceramic metal oxide NOx sensor with a sensitivity ranging from about 100-2000 parts per million (ppm), monitors an amount of NOx in the exhaust gas at a particular location of the SCR system 152 and outputs electronic signals indicative thereof. As shown, the first NOx content sensor 166 is positioned upstream from the injector 162 and is operable to systematically or randomly track, monitor in real-time, or otherwise selectively detect an amount or concentration of NOx input received by the SCR system 152. The second NOx content sensor 168 is shown positioned downstream from the SCR catalyst 158 and is operable to systematically or randomly track, monitor in real-time, or otherwise selectively detect the amount or concentration of NOx output exiting the SCR catalyst 158. These inlet and outlet sensors may also be capable of detecting the NH3 content that enters and leaves the SCR, respectively. Alternatively, the ECU 5 may also communicate with one or more discrete NH3 sensors, each of which may be in the nature of infrared, chemosorption (MOS), electrochemical, or solid-state (SS) charge-carrier-injection (CCI) sensors.

With continuing reference to FIG. 1, the SCR system 152 employs three temperature sensors 170, 172, and 174 for monitoring temperature at distinct locations along the SCR system 152 fluid path. Each of the exhaust gas temperature sensors (EGTS) 170, 172, which may be in the nature of a K-type thermocouple, a pyrometer probe, etc., systematically or randomly tracks, monitors in real-time, or otherwise selectively detects a temperature of the exhaust gas and generates signals indicative thereof. The ECU 5 may determine the temperature of the SCR catalyst 158 based on the exhaust temperature signals or based on signals received from SCR catalyst temperature sensor 174. While five sensors are shown packaged at particular locations in FIG. 1, the SCR system 152 may include greater or fewer sensing devices with similar or differing packaging locations from that which are shown in the drawings.

Figure 2:
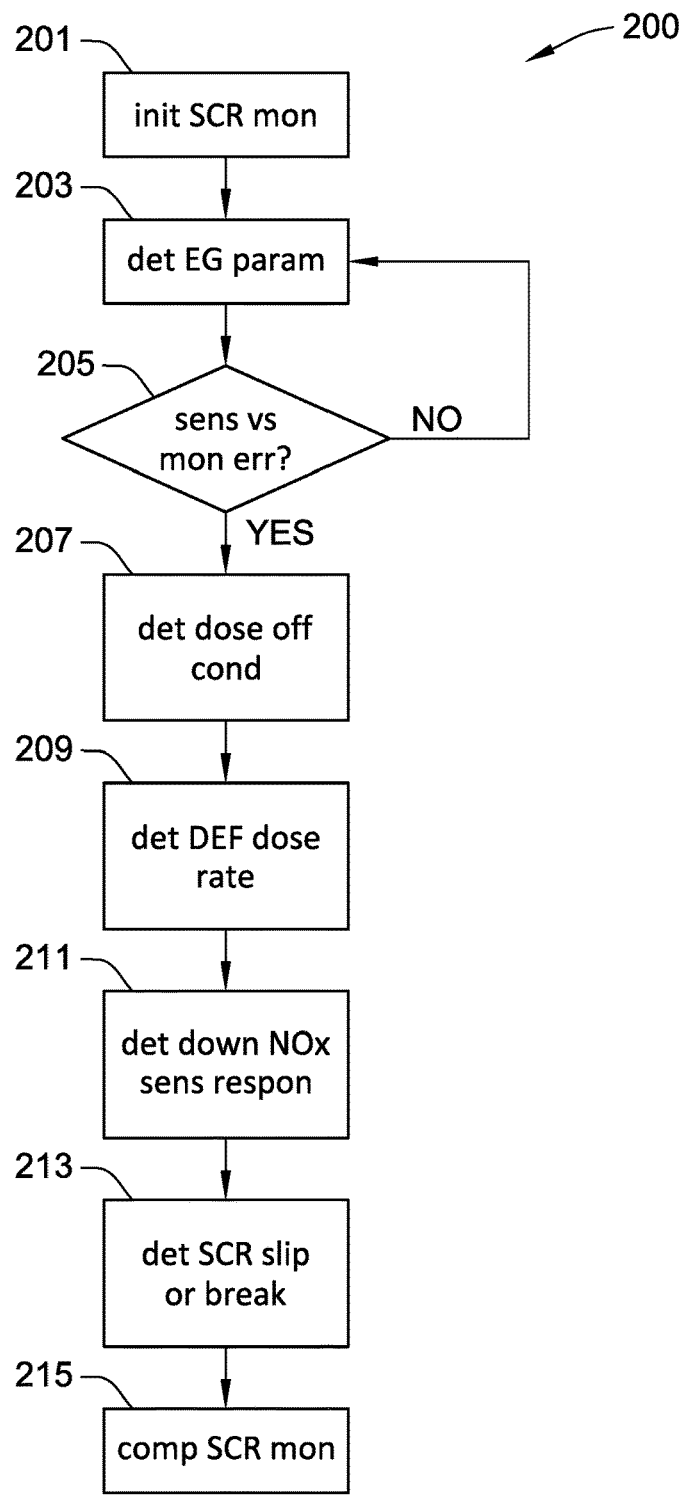
FIG. 2 is a flowchart for a representative control scheme or algorithm for SCR slip and breakthrough determination that may correspond to instructions executed by onboard or remote control-logic circuitry or other computer-based device of a motor vehicle in accord with aspects of the present disclosure.

With reference now to the flow chart of FIG. 2, an improved method or algorithm for predictive control of selective catalytic reduction during operation of an internal combustion engine, such as ICE assembly 12 of FIG. 1, for a motor vehicle, such as automobile 10 of FIG. 1, for example, is generally described at 200 in accordance with aspects of the present disclosure. FIG. 2 can be representative of an algorithm that corresponds to at least some instructions that can be stored, for example, in main or auxiliary memory, and executed, for example, by an ECU, CPU, an on-board or remote vehicle control logic circuit, or other device, to perform any or all of the above and/or below described functions associated with the disclosed concepts.

The method 200 of FIG. 2 starts at block 201 by initializing SCR system monitoring, feedback and control. This step may be initiated upon engine startup whereby the method 200 is run in a continuous loop until the ICE assembly 12 is turned off. Alternatively, the method 200 may be initialized systematically, randomly, or responsive to certain engine operating conditions. Continuing to block 203, the method 200 monitors the states of various SCR system parameters, such as exhaust gas temperature, exhaust gas mass flow, NOx concentration, NOx mass flow, NH3 concentration, NH3 mass flow, can conversion efficiency, ammonia adsorption and desorption, ammonia storage capacity, and/or exhaust flow space velocity, as some non-limiting examples. As indicated above, the inlet and outlet NOx content sensors 166, 168 generate electronic sensor signals indicative of NOx input concentration upstream and NOx output concentration downstream from the SCR catalyst 158, and transmit these signals to the ECU 5. ECU 5 may also receive electronic sensor signals indicative of exhaust gas temperatures upstream and downstream from the SCR catalyst 158 from the inlet and outlet SCR temperature sensors 170, 172, respectively.

At decision block 205, the method 200 determines if a model error condition has occurred for one of the NOx output signals received from the downstream NOx sensor 168. Prior to or contemporaneous with block 205, the method 200 may first determine if the SCR system 152 is in a steady state condition. As per the representative SCR system 152 of FIG. 1, for example, steady state may be established by observing the upstream NOx sensor signals for a calibrated period of time. A high-pass signal filter with a calibrated filter cutoff may be applied to this upstream signal; a moving time window (e.g., 5.2 second) can be used to calculate a root mean square (RMS) value for the downstream signals. This calculated RMS value is compared to a calibrated RMS value and, if the calculated RMS value is less than the calibrated RMS value, the SCR system is deemed "steady state." Conversely, if the calculated RMS value is not less than the calibrated RMS value, the SCR system is deemed "not steady state" and the method 200 may loop back to block 203 or may continue to track upstream NOx sensor signals for a steady state condition.

Responsive to the SCR system being deemed "steady state," the method 200 determines if a model error condition has occurred. This analysis may include identifying a model value from an SCR chemical model for a current SCR system operating condition, and determining if the downstream NOx output signal is greater than or less than the model value by a system calibrated value. In some embodiments, a resident or remote memory device 7 communicatively connected to the ECU 5 stores an SCR chemical model calibrated for the particular SCR system under evaluation. Also stored within the memory device 7 may be a series of system calibrated values associated with the stored model values. By way of non-limiting example, an SCR chemical model is calibrated for the specific internal combustion engine assembly 12 architecture presented in FIG. 1. The model is created by running a series of dynamometer (dyno) tests of the SCR system at different operating conditions and then calibrating the model. For instance, operating conditions may include vehicle speed (70 mph), ambient temperature (75F), and dyno coefficients. If there is no error between the downstream NOx sensor and the NOx model (Block 205=NO), the method 200 may loop back to block 203 or may continue to track downstream NOx sensor signals for a model error condition.

When there is a model error between the downstream NOx sensor and the NOx model (Block 205=YES), the method 200 will responsively determine a "designated time period," e.g., during which dosing is reduced or stopped at block 207. Determination of the designated reduction/stop time period may be based, at least in part, on the inlet temperature of the exhaust gas upstream from the SCR catalyst, e.g., as measured by inlet SCR temperature sensor 170. Optionally, designated time period may be further based on the upstream NOx concentration, e.g., as measured by inlet NOx content sensor 166, and/or the exhaust gas outlet temperature, e.g., as measured by outlet SCR temperature sensor 172. Designated time period may be set to correspond to a certain NH3 consumed amount—a calibrated ammonia burn-off mass determined based on a current temperature signal received from the SCR catalyst temperature sensor. In a specific example, calibrated ammonia burn-off mass is set based on the current exhaust temperature and NOx flow, the size of the ICE assembly, and the current temperature of the SCR catalyst. Once determined, the ECU 5 will concomitantly command the dosing injector 162 to modulate, reduce or otherwise temporarily suspend its output for at least the designated time period at block 207.

With continuing reference to FIG. 2, the method 200 determines at block 209 a modulated dosing value for the dosing injector 162. Block 209 may further require commanding dosing injector output return to normal and inject reductant in accordance with this modulated dosing value. By way of example, and not limitation, ECU 5 may be programmed to calculate a modulated dosing value by first determining a commanded injection value for the current SCR system operating condition, and multiplying this commanded injection value by an injection calibration value. After a DEF condition is performed due to an NOx model error in a steady state condition, e.g., at block 207, the DEF dosing injector 162 output is returned to normal on or otherwise activated at block 209 and contemporaneously instructed to inject urea 164 at an increased or decreased percentage of a calculated DEF dosing value. During normal operating conditions, i.e., sans a model error code, SCR control determines a given amount of DEF that is dosed to achieve SCR of NOx—previously referred to as a commanded injection value. During anomalous operating conditions where a model error code is set, the SCR system artificially modifies this commanded injection value after a designated time period to investigate the source of the error and help to ensure a clearer system response for slip or breakthrough determination. For at least some applications, the SCR system may default to a preset dosing value that is amplified from the standard commanded injection value.

Figure 3:
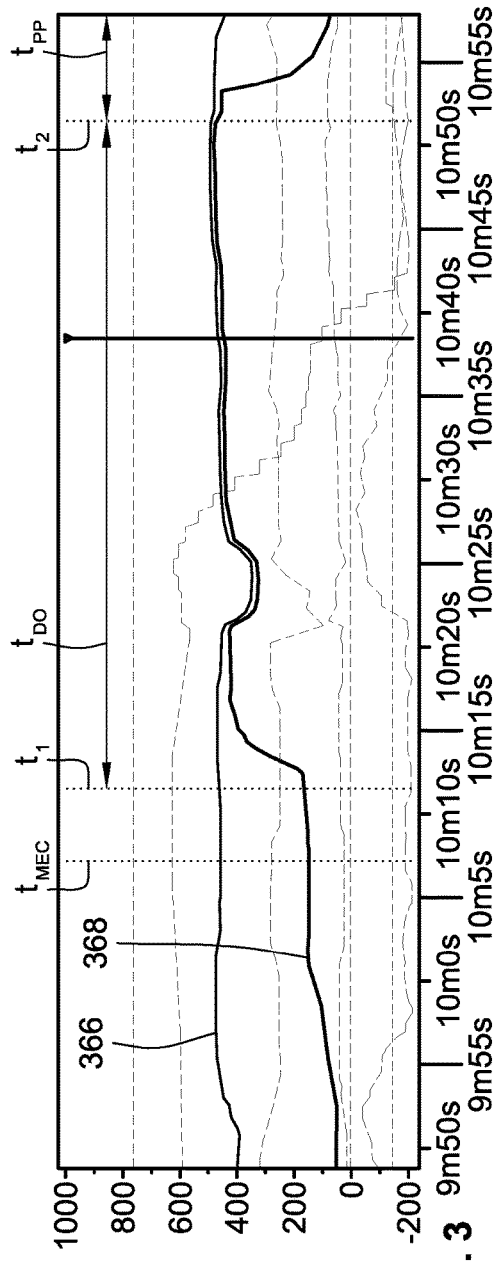
FIG. 3 is a graph plotting nitrogen oxide concentration (in parts per million (ppm)) versus time (in seconds (sec)) measured upstream and downstream of a representative SCR system catalyst to illustrate an underdose system response in accordance with aspects of the present disclosure.

Once the DEF dosing injector's 162 output is returned to normal and the modulated dosing value implemented at block 209, the ECU 5 is programmed to evaluate the response of the downstream NOx sensor 168 at block 211 to determine if the SCR system 152 is in a state of reductant overdose (slip) or a state of reductant underdose (breakthrough) at block 213. Generally speaking, SCR system underdose and overdose may be ascertained by evaluating a response shape of signals received from the downstream NOx content sensor 168 contemporaneous with and/or subsequent to the output of the dosing injector 162 being regulated to inject the modulated dosing value of reductant. As seen in FIG. 3, and described in further detail below, an underdose "breakthrough" code may be set in reaction to the response shape of the downstream NOx concentration sensor signals received from the outlet NOx content sensor having a noticeably large change, e.g., a substantially large negative slope and/or a substantially large relative (or absolute) change between beginning and end values. Conversely, an overdose "slip" code may be set in reaction to the response shape of the signals received from the outlet NOx content sensor having little or no change, e.g., a substantially zero slope and/or an insignificant relative (or absolute) change between beginning and end values during the evaluation period. In some applications, slip and breakthrough can be ascertained by evaluating the change in downstream NOx per gram (or other unit of mass) of consumed NH3.

If the SCR system 152 is in a state of underdose, the ECU 5 may respond by increasing one or more commanded injection values of the dosing injector 162, e.g., to thereby offset any deficiency in catalyst NH3 storage level. On the other hand, if the SCR system 152 is in a state of overdose, the ECU 5 may respond by decreasing one or more commanded injection values of the dosing injector 162, e.g., to thereby offset any excess dosing agent being injected into the SCR fluid line 165. The method 200 of FIG. 2 proceeds to block 215 and completes a sequence of the predictive control procedure. If a continuous loop is desired, block 215 may comprise automatically looping back to block 201 to initialize SCR system monitoring, feedback and control.

FIG. 3 illustrates an underdose system response of a representative SCR system. In this example, the graph plots nitrogen oxide concentration (in parts per million (ppm) on the vertical axis) versus time (in seconds (sec) on the horizontal axis) measured upstream and downstream from an SCR catalyst. Upstream (inlet) NOx content sensor signals 366 are juxtaposed with downstream (outlet) NOx content sensor signals 368 during dose stoppage and/or modulated dosing. As shown, the SCR system DEF injector output is modulated at time $t_1$ after the occurrence of a model error code at time $t_{MEC}$. After expiration of a predetermined time period $t_{DO}$, DEF injector output is returned to normal at time $t_2$ for predetermined programmed period of time $t_{PP}$. It can be seen from this graph that, when dosing is normalized at a modulated dosing value, the downstream NOx concentration, as read by an outlet NOx content sensor, drops dramatically. The downstream NOx content sensor signals 368 has a very distinctive response shape—rapidly decreasing with a large negative slope and correspondingly large change in NOx ppm values—indicating that the downstream sensor is seeing sufficient NOx to suggest breakthrough and, thus, an underdose state. It can also be seen that, if the doser's output is returned to normal after 10-15 seconds, the same result would occur (i.e., noticeable drop in downstream NOx signal). By implementing a shorter designated time period (e.g., approximately 25-35 seconds) tailpipe NOx emissions are reduced. In addition, there is less time for outside influences triggering a system abort operation or causing issues with the slip and breakthrough determination (e.g., pedal movement, wind, hill, etc.).

Figure 4:
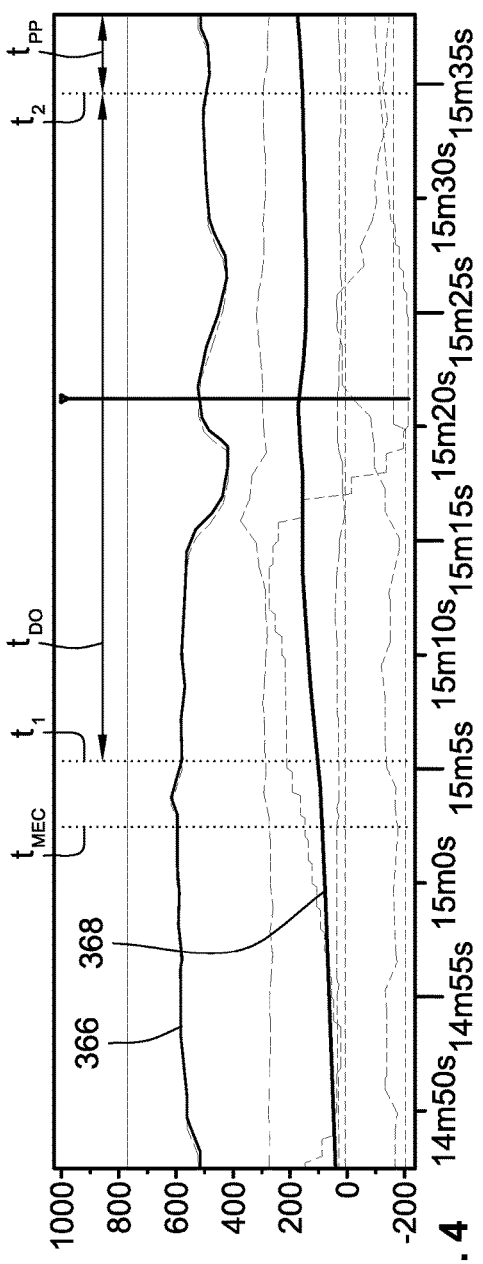
FIG. 4 is another graph plotting upstream and downstream NOx concentration versus time to illustrate an overdose response of the representative SCR system of FIG. 3.

FIG. 4 illustrates an overdose system response of a representative SCR system. Upstream (inlet) NOx content sensor signals 466 are juxtaposed with downstream (outlet) NOx content sensor signals 468 during dose stoppage and modulated dosing. As shown, the SCR system DEF injector output is modulated at time $t_1$ after the occurrence of a model error code at time $t_{MEC}$. After expiration of a predetermined time period $t_{DO}$, DEF injector is normalized at time $t_2$ for predetermined programmed period of time $t_{PP}$. This graph shows that, when dosing is normalized at a modulated value, the downstream NOx concentration, as read by an outlet NOx content sensor, does not have a significant change. There is a slight drop seen in the illustration, but the slope is very small. It can also be seen that, if the doser output is returned to normal after 10-15 seconds, the same result would occur (i.e., little or no drop in downstream NOx signal/small slope).

Disclosed predictive control systems and methods help to increase robustness of steady state slip and breakthrough determination. Disclosed predictive control systems and methods help to minimize false "learning" of SCR state, which helps to reduce tailpipe NOx emissions due to unnecessarily long "intrusive steady state tests." In addition, disclosed predictive control systems and methods help to reduce the likelihood of aborting an intrusive test and less chance for road/ambient/pedal input condition influencing the calculation. Additionally, if the system "learns falsely," the system can "cascade" until a code is set for adaptation error.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A predictive control system for regulating a selective catalytic reduction (SCR) system, the SCR system including an SCR catalyst, a reductant storage tank fluidly connected to the SCR catalyst, and a dosing injector for injecting reductant onto the SCR catalyst to chemically reduce nitrogen oxide (NOx) emissions, the predictive control system comprising:
an outlet NOx content sensor configured to detect NOx output downstream from the SCR catalyst and output signals indicative thereof;
an inlet SCR temperature sensor configured to detect exhaust gas inlet temperature upstream from the SCR catalyst and output signals indicative thereof; and
an electronic control unit (ECU) communicatively connected to the outlet NOx content sensor and the inlet SCR temperature sensor, the ECU being configured to:
receive, from the outlet NOx content sensor, a signal indicative of the NOx output downstream from the SCR catalyst;
receive, from the inlet SCR temperature sensor, a signal indicative of the exhaust gas inlet temperature upstream from the SCR catalyst;
determine if a model error condition has occurred for the NOx output signal;
responsive to a determination that the model error condition has occurred, determine a designated time period based on the exhaust gas inlet temperature signal;
command the dosing injector to modulate output for at least the designated time period;
determine a modulated dosing value for the dosing injector;
upon expiration of the designated time period, command the dosing injector to activate and inject reductant in accordance with the modulated dosing value; and
determine if the SCR system is in an underdose state or an overdose state based on a response shape of signals received from the outlet NOx content sensor after the dosing injector is commanded to inject the modulated dosing value of reductant.

2. The predictive control system of claim 1, wherein the ECU is further configured to, responsive to a determination that the SCR system is in the underdose state, increase a commanded injection value of the dosing injector.

3. The predictive control system of claim 1, wherein the ECU is further configured to, responsive to a determination that the SCR system is in the overdose state, decrease a commanded injection value of the dosing injector.

4. The predictive control system of claim 1, further comprising:
an inlet NOx content sensor configured to detect NOx input upstream from the SCR catalyst and output signals indicative thereof;
an outlet SCR temperature sensor configured to detect exhaust gas outlet temperature downstream from the SCR catalyst and output signals indicative thereof,
wherein determining the designated time period is further based on an NOx input signal received from the inlet NOx content sensor and an exhaust gas outlet temperature signal received from the outlet SCR temperature sensor.

5. The predictive control system of claim 1, further comprising:
an SCR catalyst temperature sensor configured to detect current temperature of the SCR catalyst and output signals indicative thereof,
wherein determining a designated time period is further based on a calibrated ammonia burn-off mass determined based on a current temperature signal received from the SCR catalyst temperature sensor.

6. The predictive control system of claim 1, further comprising a memory device communicatively connected to the ECU and storing an SCR chemical model calibrated for the SCR system.

7. The predictive control system of claim 6, wherein determining if the model error condition has occurred includes identifying a model value from the SCR chemical model for a current SCR system operating condition, and determining if the NOx output signal is greater than or less than the model value by a system calibrated value.

8. The predictive control system of claim 1, wherein determining the SCR system is in the underdose state includes the response shape of the signals received from the outlet NOx content sensor including a substantially large negative slope.

9. The predictive control system of claim 1, wherein determining the SCR system is in the underdose state includes the response shape of the signals received from the outlet NOx content sensor including a substantially large relative change between beginning and end values.

10. The predictive control system of claim 1, wherein determining the SCR system is in the overdose state includes the response shape of the signals received from the outlet NOx content sensor including a substantially zero slope.

11. The predictive control system of claim 1, wherein the ECU is further configured to determine if the SCR system is in a steady state condition, and wherein the determining if the model error condition has occurred is responsive to a determination that the SCR system is in a steady state condition.

12. The predictive control system of claim 11, further comprising:
an inlet NOx content sensor configured to detect NOx input upstream from the SCR catalyst and output signals indicative thereof,
wherein determining if the SCR system is in the steady state condition includes calculating a root mean square of NOx input signals received from the inlet NOx content sensor.

13. The predictive control system of claim 1, wherein determining the modulated dosing value includes determining a commanded injection value for a current SCR system operating condition, and multiplying the commanded injection value by an injection calibration value.

14. A motor vehicle, comprising:
a vehicle body defining an engine compartment;

an internal combustion engine (ICE) assembly stowed in the engine compartment, the ICE assembly including an engine block with a plurality of cylinders bores, and a plurality of pistons each reciprocally movable within a respective one of the cylinder bores;

a selective catalytic reduction (SCR) system fluidly coupled to the ICE assembly, the SCR system including an SCR catalyst, a storage tank storing a fluid reductant and fluidly connected to the SCR catalyst, and a dosing injector operable to inject the fluid reductant from the storage tank to the SCR catalyst;

an outlet NOx content sensor configured to detect NOx output downstream from the SCR catalyst and output signals indicative thereof;

an inlet SCR temperature sensor configured to detect exhaust gas inlet temperature upstream from the SCR catalyst and output signals indicative thereof; and a programmable electronic control unit (ECU) communicatively connected to the outlet NOx content sensor and the inlet SCR temperature sensor, the ECU being programmed to:

receive, via the outlet NOx content sensor, a signal indicative of the NOx output downstream from the SCR catalyst;

receive, via the inlet SCR temperature sensor, a signal indicative of the exhaust gas inlet temperature upstream from the SCR catalyst;

determine if a model error condition has occurred for the NOx output signal;

responsive to a determination that the model error condition has occurred, determine a designated time period based on the exhaust gas inlet temperature signal;

command the dosing injector to modulate output for at least the designated time period;

determine a modulated dosing value for the dosing injector;

upon expiration of the designated time period, command the dosing injector to activate and inject reductant in accordance with the modulated dosing value; and determine if the SCR system is in an underdose state or an overdose state based on a response shape of signals received from the outlet NOx content sensor after the dosing injector is commanded to inject the modulated dosing value of reductant.

15. A method of operating a predictive control system for regulating a selective catalytic reduction (SCR) system, the SCR system including an SCR catalyst, a reductant storage tank fluidly connected to the SCR catalyst, and a dosing injector for injecting reductant onto the SCR catalyst to chemically reduce nitrogen oxide (NOx) emissions, the method comprising:

receiving, via a controller from an outlet NOx content sensor, a signal indicative of an NOx output downstream from the SCR catalyst;

receiving, via the controller from an inlet SCR temperature sensor, a signal indicative of an exhaust gas inlet temperature upstream from the SCR catalyst;

determining if a model error condition has occurred for the NOx output signal;

responsive to a determination that the model error condition has occurred, determining a designated time period based on the exhaust gas inlet temperature signal;

modulating output of the dosing injector for at least the designated time period;

determining a modulated dosing value for the dosing injector;

upon expiration of the designated time period, activating and commanding the dosing injector to inject reductant in accordance with the modulated dosing value; and after the dosing injector is commanded to inject the modulated dosing value of reductant, determining if the SCR system is in an underdose state or an overdose state based on a response shape of signals received from the outlet NOx content sensor.

16. The method of claim 15, further comprising:

responsive to a determination that the SCR system is in the underdose state, increasing a commanded injection value of the dosing injector; and responsive to a determination that the SCR system is in the overdose state, decreasing a commanded injection value of the dosing injector.

17. The method of claim 15, wherein determining the designated time period is further based on an NOx input signal received from an inlet NOx content sensor and an exhaust gas outlet temperature signal received from an outlet SCR temperature sensor.

18. The method of claim 15, wherein determining a designated time period is further based on a calibrated ammonia burn-off mass determined based on a current temperature signal received from an SCR catalyst temperature sensor.

19. The method of claim 15, wherein determining if the model error condition has occurred includes identifying a model value for a current SCR system operating condition from an SCR chemical model calibrated for the SCR system, and determining if the NOx output signal is greater than or less than the model value by a system calibrated value.

20. The method of claim 15, wherein determining the SCR system is in the underdose state includes the response shape of the signals received from the outlet NOx content sensor including a substantially large negative slope, and wherein determining the SCR system is in the overdose state includes the response shape of the signals received from the outlet NOx content sensor including a substantially zero slope.

* * * * *